United States Patent [19]

Feinbloom et al.

[11] 4,445,010
[45] Apr. 24, 1984

[54] ROTARY SWITCH ASSEMBLY

[75] Inventors: Richard E. Feinbloom; Melvin Levine, both of New York, N.Y.

[73] Assignee: Designs for Vision, Inc., New York, N.Y.

[21] Appl. No.: 419,901

[22] Filed: Sep. 20, 1982

[51] Int. Cl.³ .............................................. H01H 19/58
[52] U.S. Cl. ................................. 200/11 R; 200/11 J; 362/32; 362/285
[58] Field of Search .................. 200/291, 11 R, 11 A, 200/11 B, 11 C, 11 D, 11 DA, 11 E, 11 EA, 11 G, 11 H, 11 J, 11 K, 11 TC, 11 TW; 353/87, 88, 89, 90, 91, 92; 362/32, 233, 250, 238, 239, 240, 285, 269; 74/527

[56] References Cited

U.S. PATENT DOCUMENTS 3,959,612  5/1976  Feinbloom .......................... 200/11 R
4,052,573  10/1977  Kojima et al. ....................... 200/11 A Primary Examiner—George H. Miller, Jr.
Assistant Examiner—Morris Ginsburg
Attorney, Agent, or Firm—Arthur L. Plevy

[57] ABSTRACT

There is disclosed a rotary switch assembly which comprises a lamp support plate adapted to accommodate a plurality of switchable lamps. A power contact and a detent plate is positioned above the lamp plate and contains spring loaded power contacts which coact with terminals associated with the lamp support plate to enable energization of any selected one of said plurality of lamps. The power contact and detent plate further includes spring loaded detents which cooperate with detent recesses on the lamp support plate to assure optical alignment. These spring loaded detents are positioned approximately opposite to the power contacts and exert counter balancing forces to assure low shaft friction as the lamp support plate is rotated during lamp selection.

8 Claims, 9 Drawing Figures

ROTARY SWITCH ASSEMBLY

BACKGROUND OF THE INVENTION

This invention relates to a rotary switch assembly and more particularly to such a switch assembly adapted to selectively energize one of several different lamps from a single power source, and to assure that the lamp, when selected and energized is properly aligned to an optical system.

Essentially, the closest prior art in regard to the switch assembly to be described is shown in U.S. Pat. No. 3,959,612 entitled ROTARY SWITCH ASSEMBLY PARTICULARLY ADAPTED FOR USE WITH FIBER OPTIC LIGHT SOURCES, issued May 25, 1976, to Richard E. Feinbloom and assigned to Designs for Vision, Inc., the assignee herein. In that patent there is described typical prior art which involves the switching of lamps in various devices. The patent clearly describes the particular problem solved by the rotary switch when used in conjunction with a cold light source as employed by a surgeon in an operating room procedure. Essentially the rotary switch shown in the above noted patent includes three main elements, namely, a lamp support plate, a power contact support plate and an outer annular ring which serves as a housing and controls the detented operation of the entire assembly. The rotary switch according the the above patent has been widely employed and extensively used and is an extremely reliable device. In any event, it is an object of the present invention to provide an improved rotary switch assembly whereby the outer annular ring is eliminated. Thus, the improved rotary switch to be described herein is more economical to manufacture, smoother operating and is extremely reliable. It is therefore a further objective of the present invention to provide an improved rotary switch assembly particularly adapted for use with a fiber light source.

BRIEF DESCRIPTION OF THE PREFERRED EMBODIMENT

A rotary switch assembly for selecting any one of a plurality of lamps comprising a first plate having a plurality of lamp accommodating sockets located on a surface thereof, each of said sockets associated with one of said lamps. At least one terminal located on each socket and electrically connected to an associated terminal area on the other surface of said plate, with said other surface further including detent recesses positioned between said terminals. A second plate positioned above and in alignment with said first plate and having on a surface thereof closest to said terminal area surface of said first plate, at least one spring loaded contact positioned to coact with any one of said terminal areas associated with said one lamp, and at least one spring loaded detent means separated from said contact positioned to coact with any one of said detent recesses positioned between said terminals. Means coupled to said first plate for rotating said first plate with respect to said second plate to cause said spring loaded contact to coact with any selected terminal area associated with any one selected lamp as determined by said spring loaded detent means coacting with a selected one of said detent recesses, with said spring loaded detent means exerting a force on said first plate to balance the force exerted by said spring loaded contact to thereby cause any lamp selected to be properly optically aligned with respect to said first plate.

DETAILED DESCRIPTION OF THE FIGURES

Before proceeding with a detailed description of the invention, certain comments are believed to be warranted in order to understand the improvement and the advantages thereof. As described in U.S. Pat. No. 3,959,612, a rotary switch of the configuration to be described is employed by a surgeon during an operation or other surgical procedure. Essentially, the lamp provides a high intensity source of light which is directed through a fiber optic cable and used to illuminate an area of the patient that the surgeon is operating on. In regard to such a device, there is a need for the lamp to have the optical axis accurately aligned with the fiber optic cable. This is necessary in order to transmit the desired amount of light. The advantages of the light source and the requirements for the switch assembly are clearly depicted and described in the above noted patent. In any event, the rotary switch to be described possesses all the advantages of the prior art structure while eliminating a relatively expensive component and unwanted friction.

Figure 1:
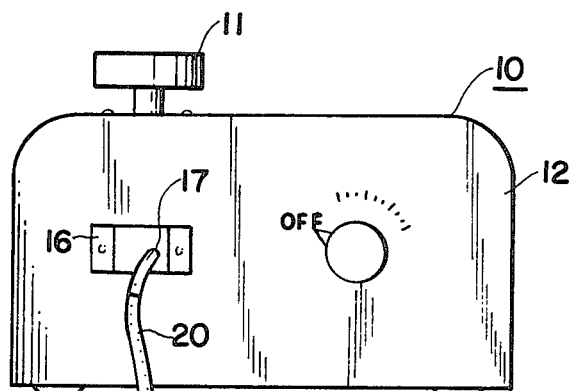
FIG. 1 is a front plan view of a selective light source useful with this invention.

Referring to FIG. 1, there is shown a front plan view of a typical fiber optic light source assembly and housing 10. Basically, the unit shown in the figure is representative of prior art devices as for example the light source shown in the above noted patent. The assembly 10 includes a knob 11 which when rotated will enable to user to provide lamp switching as necessary.

The unit 10 is housed in a metal or similar rectangular housing 12. It shows a light source aperture plate 16 into which a fiber optic cable 20 can be inserted. Located in alignment with the aperture 17 in the plate 16 is the optical axis of the filament of a high intensity lamp. The fiber optic cable 20 is retained in the aperture 17 by means of conventional coupling means. An example of a typical coupling technique is depicted in the above noted patent.

In a typical application the length of the fiber optic cable 20 can vary but is typically 7.5 feet long and comprises a plurality of individual fiber optic elements to form a flexible light transmitting cable 20.

Figure 2:
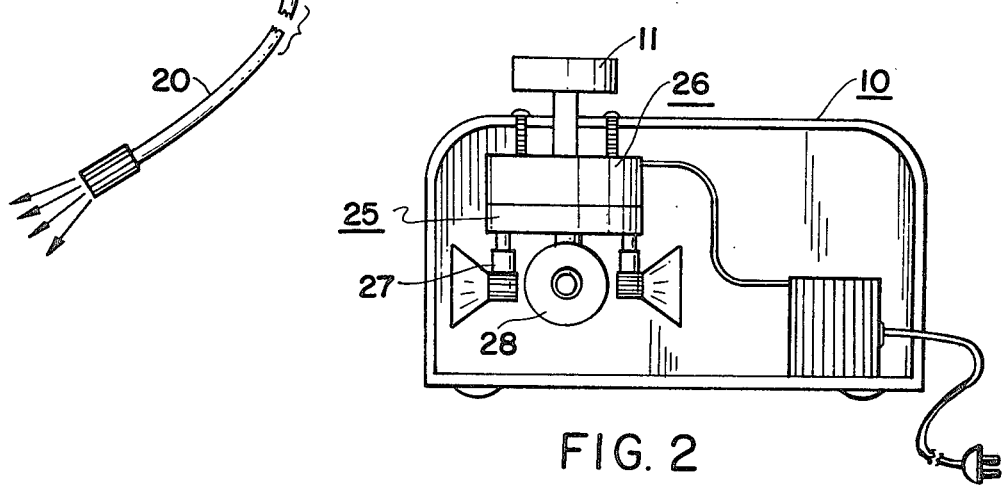
FIG. 2 is a sectional view of the light source depicting the switching assembly located within the housing.

Referring to FIG. 2 there is shown a sectional view of the housing 10 which depicts the rotary switch assembly to be described in detail. The rotary switch assembly consists of two main parts, namely, a lower support plate 25 and a power contact and detent plate 26. As seen from FIG. 2, the lamp support plate includes four sockets as 27, each of which accommodates a high intensity lamp as 28. As the knob 11 is rotated, one can select any one of the four lamps to thereby direct light through the aperture 17 and therefore to the fiber optic cable 20. The lamp support plate 25 and the contact support plate 26 are preferably fabricated from a suitable insulating material such as a plastic. A suitable plastic would be NYLATRON GSM which has a good electrical and flammability characteristic. Other types of plastics such as Phenolics can be employed as well. There are many examples of plastics that can be used which plastics are both insulating and self-lubricating, as will be explained. The lamp support plate 25 accommodates four sockets such as 27 into which a suitable lamp 28 such as a Haolgen unit can be inserted and held. A typical lamp is the Sylvania DNF Halogen lamp which operates at 21 volts at 150 watts. This lamp is a tungsten filament Halogen lamp and is provided by the manufacturer with a built in reflector. The design of the lamp is such that the potential axis passes through the geometric center of the filament or lamp housing, and has a predetermined focal length. Because of the focal length, the lamps are positioned on the plate 25 so that rotation of the plate 25 assures that all lamps when rotated into position will maintain the proper focal distance to the end of the fiber optic cable 20.

In regard to operation of the rotary switch each lamp as positioned on the plate 25 can be rotated into exact alignment with the aperture 17 to therefore optimumly illuminate the fiber optic cable 20. Thus as a lamp fails, all one has to do is to rotate or turn the knob 11 until the detent mechanism to be described indicates that the next bulb is in proper position. During rotation of the plate 25, power is automatically supplied to the new bulb. Thus, with four bulbs the effective life of the optical source has been extended four times and therefore the rotary switch virtually eliminates the difficulties amongst hospital personnel which would be caused by bulb failure during an operating procedure.

Figure 3:
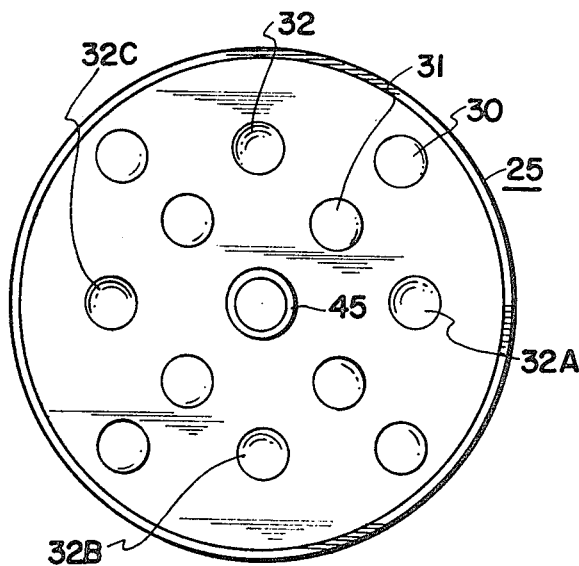
FIG. 3 is a top plan view of a lamp support plate used in the rotary switch.

Referring to FIG. 3, there is shown a top view of the lamp support plate 25. The support plate 25 is circular in diameter and is fabricated from an insulating plastic. The top surface of the plate 25 has four pairs of contacts as 30 and 31 with each pair of contacts associated with a separate lamp. As seen from FIG. 3, the contacts 30 and 31 comprise the two contacts necessary to energize the associated lamp assembly. The contacts 30 and 31 are relatively smooth and protrude slightly from the surface of the plate 25. Positioned between each pair of contacts is a separate detent or recess aperture as 32 32A, 32B and 32C. As will be explained, these apertures are positioned at 90° intervals about the circumference of a circle and accurately indicate the position of each pair of power contacts as 30 and 31.

Figure 4:
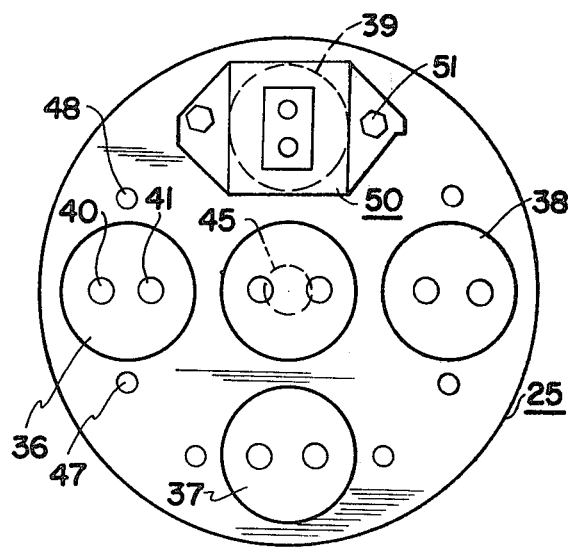
FIG. 4 is a bottom plan view of the lamp support plate.

Referring to FIG. 4, there is shown a bottom plan view of the lamp support plate 25. As seen, the plate 25 has four socket accommodating recesses 36, 37, 38, and 39. Located within each recess are two terminal apertures as 40 and 41. These apertures contain conducting wires or rods which may be fabricated from copper or another good conductor. The conducting terminals in apertures 40 and 41 extend to the opposite surface of the plate where they are in direct contact with the contact areas 30 and 31. The support plate 25 includes a central shaft 45 which shaft is coupled to the knob 11 to allow rotation of the lamp support plate as will be explained. As seen in FIG. 4 adjacent each socket recess as 36 are two apertures or holes 47 and 48. These holes are employed to secure a socket member 50 to the support plate 25. The socket member 50 is shown in FIG. 4 as associated with recess 39. The socket member 50 is commercially available and is designed to accomodate and secure a Halogen lamp. The socket member 50 has extending tabs with apertures as 51 to enable the same to be secured to the plate 25 by screws inserted into apertures 47 and 48.

Figure 5:
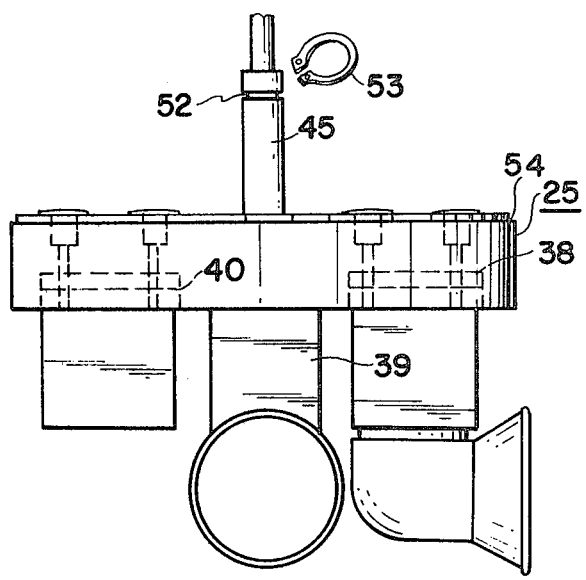
FIG. 5 is a side plan view of the lamp support plate.

Referring to FIG. 5, there is shown a side view of the lamp support plate which basically clearly indicates the structure depicted above. As can be seen from FIG. 5, the support plate has a peripheral depression 54 which coacts with an extending flange located above the periphery of the power contact and detent plate 26. Also depicted in FIG. 5 is the extending shaft 45. The shaft 45 has a groove 52 located near the top end. This groove accommodates a snap ring 53 which is used to secure the lamp support plate 25 with the power plate 26. Essentially, the snap ring 53 together with the detent structure replaces the entire outer annular ring employed in the above noted patent.

Figure 6:
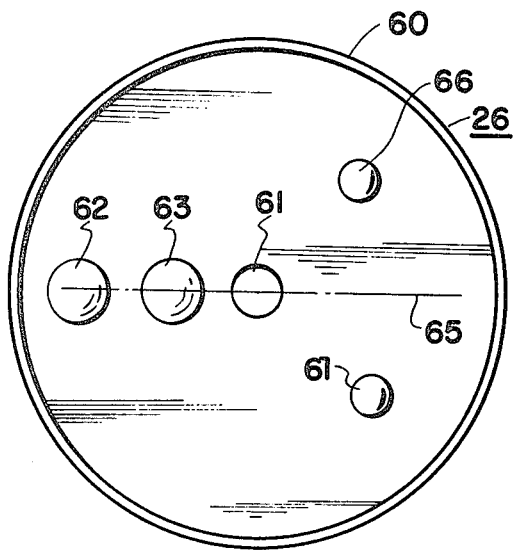
FIG. 6 is a bottom plan view of the power contact and detent plate.

Referring to FIG. 6, there is shown a top plan view of the power contact detent plate 26. The plate 26 as indicated, has an outer extending flange 60 which is positioned with the ridge 54 when the plates are assembled in the switch assembly. The plate 26 has a central aperture 61 for accommodating the extending shaft 45 associated with plate 25. Located on a diameter are two apertures 62 and 63. The apertures 62 and 63 are spaced in accordance with contacts 30 and 31 of the plate 25. Each aperture contains a spring loaded contact as will be explained. These contacts are directed to a source of power for providing the operating voltage to the lamp assembly. As seen from FIG. 6, the apertures 62 and 63 are located on the diameter 65 of the plate 26. Also shown in FIG. 6 are two detent apertures 66 and 67. Each detent aperture contains a spring and a ball bearing and the apertures 66 and 67 are positioned to coact with the recesses as 32 positioned on the plate 25.

Figure 7:
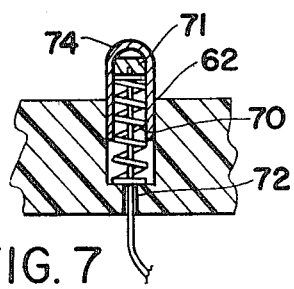
FIG. 7 is a partial cross sectional view of a power contact.

Referring to FIG. 7, there is shown a cross sectional view of a power contact as would be positioned in apertures 62 or 63. Essentially, the power contact includes a spring 70 which presses on to a conductive terminal 71. The terminal 71 is electrically connected to a wire 72 which is directed to a suitable terminal of a power source. Overlying the conductive terminal 71 is a conductive cap 74. The cap 74 is maintained in electrical contact with the terminal 71 by means of the dimensions. The spring 70 sits in aperture 62 and exerts an appropriate force, as will be explained, on the contact. It is of course understood that the power contact arrangement as depicted in FIG. 7 is included in each aperture as 62 and 63.

Figure 8:
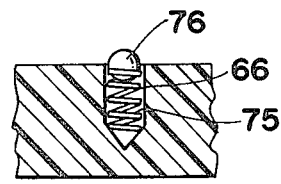
FIG. 8 is a partial cross sectional view of a spring actuated detent.

Referring to FIG. 8, the detent mechanism is depicted. The detent mechanism is positioned within apertures 66 and 67 and comprises a spring 75. On top of the spring 75 there is a ball 76 which is merely positioned on the top surface of the spring.

Figure 9:
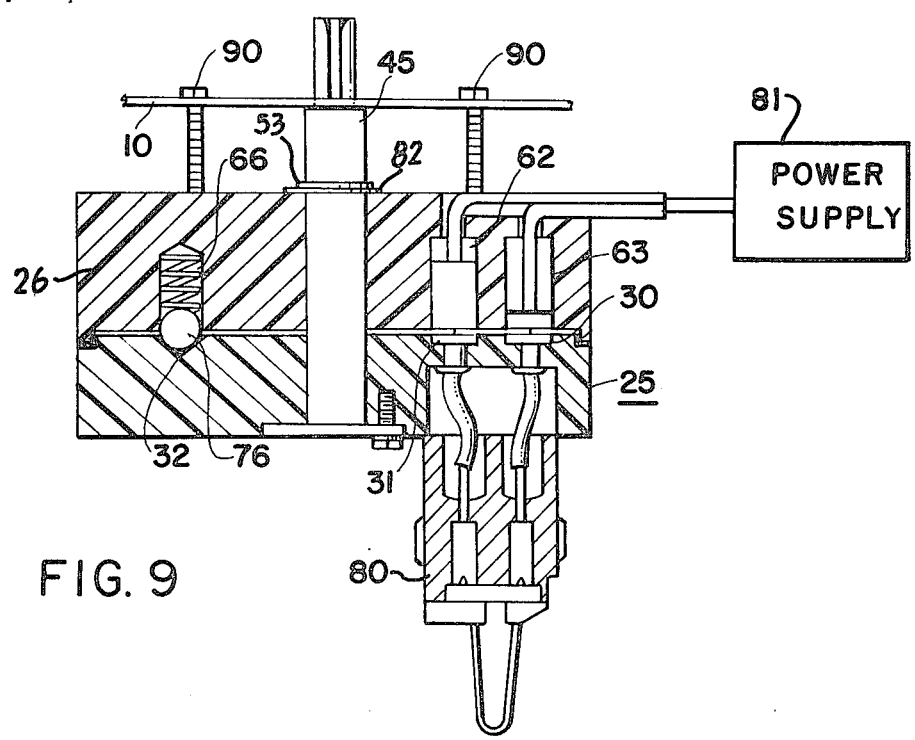
FIG. 9 is a cross sectional view of an assembled rotary switch according to this invention.

Referring to FIG. 9, there is shown an assembled rotary switch according to this invention. As seen in FIG. 9, the rotary switch has the two wires from the power contacts directed to a power supply 81. The plate 26 is positioned above the plate 25 and is held in position by means of the snap ring 53 secured within the groove 52 of the shaft 45. As shown, the power contacts in apertures 62 and 63 are in contact with the terminals at 31 and 30 of the plate 25. This thereby supplies operating power to the lamp assembly which is associated with the socket 50. Also shown on the left is one detent mechanism as 66 coacting with the recess 32. It is of course understood that the opposing detent mechanism associated with aperture 67 would be coacting with a recess at 32, on the other side of the contacts 30 and 31. Thus for each bulb selected, the detent mechanism is apertures 66 and 67 are positioned with the corresponding recess as 32. When the shaft 45 is rotated, the balls as 76 ride on the surface of the plate 25 until the next pair of recesses causes the spring to push the ball into the recess. This provides a detent action whereby a user can feel the switch position as the shaft 45 is rotated. In this manner each of the four bulbs can be selected in turn. The operation is rapid and simple due to the detent structure above described. As the shaft is rotated the detent assembly provides accurate alignment of the optical axis as the recesses 32 are accurately positioned on plate 25 with respect to the contacts 30 and 31. It is also noted and important that the plates do not tend to cock with respect to one another. This is because the spring actuated detents as 66 and 67 assure that approximately equal forces are applied within the assembly to counteract the forces exerted by the spring operated power contacts. In this manner the spring forces of the detents and the contacts are approximately balanced about the shaft 45 and therefore there is a minimum of unbalanced forces present in the assembly which will tend to cock the upper plate on the shaft 45 with resulting friction.

In this manner one obtains reliable detent operation while eliminating the relatively large outer plate found in the prior art design. In regard to this aspect the above structure is functionally equivalent to the rotary switch of the prior art but eliminates the outer annular retaining ring. This therefore allows for a smaller assembly with fewer component parts and hence improves reliability. The plates 25 and 26 are secured together by the simple snap ring. Also located under the snap ring as shown in FIG. 9 is a thin metal washer 82 which is used to prevent damage to the plastic plate when the assembly is rotated. It is a main aspect of the above noted structure to provide lamp switching capability while maintaining an accurate alignment of the optical axis of each lamp. This feature is provided by the spring loaded detents each of which is associated with a ball bearing which due to the action of the spring counter balances the forces exerted on the lamp support plate by the power contacts. Thus the above noted detent mechanism provides a dual purpose of accurately locating a lamp assembly while at the same time preventing the cocking of the assembly to maintain accurate optical alignment.

Also shown in FIG. 9 are positioning screws 90 which secure the contact plate 26 to the housing 10 of the light source. In this manner the top surface of plate 26 contains a number of apertures which will accommodate suitable screws to maintain the assembly in position with respect to the housing. It is, of course, understood that suitable spacers (not shown) can be emplaced over the screws to accurately position and maintain the switch within the housing.

We claim:

1. A rotary switch assembly for selecting any one of a plurality of lamps, comprising:
   (a) a first plate having a plurality of lamp accommodating sockets located on a surface thereof, each of said sockets adapted to accommodate one of said lamps,
   (b) at least one terminal located on each socket and electrically connected to an associated terminal area on the other surface of said plate, with said other surface further including detent recesses positioned between said terminals,
   (c) a second plate positioned above and in alignment with said first plate and having on a surface thereof closest to said terminal area surface of said first plate, at least one spring loaded contact positioned to coact with any one of said terminal areas associated with said one socket, and first and second spring loaded detent means separated from said contact and positioned on an opposite side of said second plate from said contact and located to coact with two adjacent detent recesses positioned between said terminals.
   (d) means coupled to said first plate for rotating said first plate with respect to said second plate to cause said spring loaded contact to coact with any selected terminal area associated with any one selected socket as determined by said spring loaded detent means coacting with a selected two of said detent recesses, with said spring loaded detent means exerting a force on said first plate to balance the force exerted by said spring loaded contact to thereby cause any socket selected to be properly optically aligned with respect to said first plate, with said exerted force of said spring loaded detent means balancing said force of said spring loaded contact due to the location of said detent means on the side of said plate opposite said spring loaded contact.

2. The rotary switch assembly according to claim 1, wherein said first plate further includes a plurality of recesses for accommodating said lamp accommodating sockets.

3. The rotary switch assembly according to claim 1, wherein said first plate has an extending central shaft, with said second plate having a central aperture for accommodating said shaft when said second plate is positioned above said first plate and means coupled to said shaft for securing said first and second plates in position.

4. The rotary switch assembly according to claim 1, wherein said spring loaded contact is positioned within an aperture on said second plate, with said aperture containing a spring having a top end coupled to a contact area with a conductive cap positioned over said contact area, and a conductor coupled to said contact area and directed through said aperture for coupling to a source of power.

5. The rotary switch assembly according to claim 1, wherein said plurality of lamp accommodating sockets are four sockets, each arranged about the periphery of a circle at ninety degree intervals.

6. The rotary switch assembly according to claim 5, wherein said detent recesses are four in number, each positioned between one of said sockets.

7. The rotary switch assembly according to claim 1, wherein said first and second plates are circular in configuration and of the same diameter, with said first plate having a peripheral depression on the surface thereof coacting with said second plate, with said second plate having a coacting extending flange on the surface thereof for insertion into said depression of said first plate.

8. The rotary switch assembly according to claim 1, wherein said first and second plates are fabricated from an insulating plastic.

* * * * *